United States Patent [19]

Minehisa et al.

[11] 4,074,105
[45] Feb. 14, 1978

[54] ARC WELDING METHOD AND ARC WELDING APPARATUS

[75] Inventors: Setsuzi Minehisa, Itami; Tatuo Inui, Osaka; Hitoshi Fukuda, Shiki, all of Japan

[73] Assignee: Hitachi Shipbuilding & Engineering Co., Ltd., Osaka, Japan

[21] Appl. No.: 634,190

[22] Filed: Nov. 21, 1975

[30] Foreign Application Priority Data

Nov. 22, 1974 Japan .............................. 49-135770
Apr. 11, 1975 Japan .............................. 50-44425

[51] Int. Cl.² .............................................. B23K 9/12
[52] U.S. Cl. ................................ 219/137.8; 219/124; 219/125.12
[58] Field of Search ............... 219/76, 124, 125 R, 219/126, 137 R, 130; 72/78, 79; 140/112, 122, 124, 140

[56] References Cited

U.S. PATENT DOCUMENTS

| | | | |
|---|---|---|---|
| 3,519,789 | 7/1970 | Nelson et al. | 219/137 R |
| 3,543,810 | 12/1970 | Scheller | 140/147 |
| 3,567,900 | 3/1971 | Nelson et al. | 219/124 |
| 3,576,966 | 5/1971 | Sullivan | 219/137 R |
| 3,585,343 | 6/1971 | Crichton | 219/126 |
| 3,806,695 | 4/1974 | Carroll et al. | 219/126 |
| 3,808,396 | 4/1974 | Ashton et al. | 219/126 |
| 3,920,946 | 11/1975 | Takahashi et al. | 219/126 |

*Primary Examiner*—J. V. Truhe
*Assistant Examiner*—Clifford C. Shaw
*Attorney, Agent, or Firm*—Birch, Stewart, Kolasch & Birch

[57] ABSTRACT

This invention provides arc welding methods and arc welding apparatus which weld materials by giving a plastic deformation of definite curvature to wire itself in a process before supplying the wire to a welding nozzle, restoring the wire delivered from the welding nozzle to the plastic deformation of definite curvature, delivering rotatively the end of the wire in a definite period from a delivery hole of the welding nozzle in butt welding of thick board, especially narrow gap welding.

5 Claims, 7 Drawing Figures

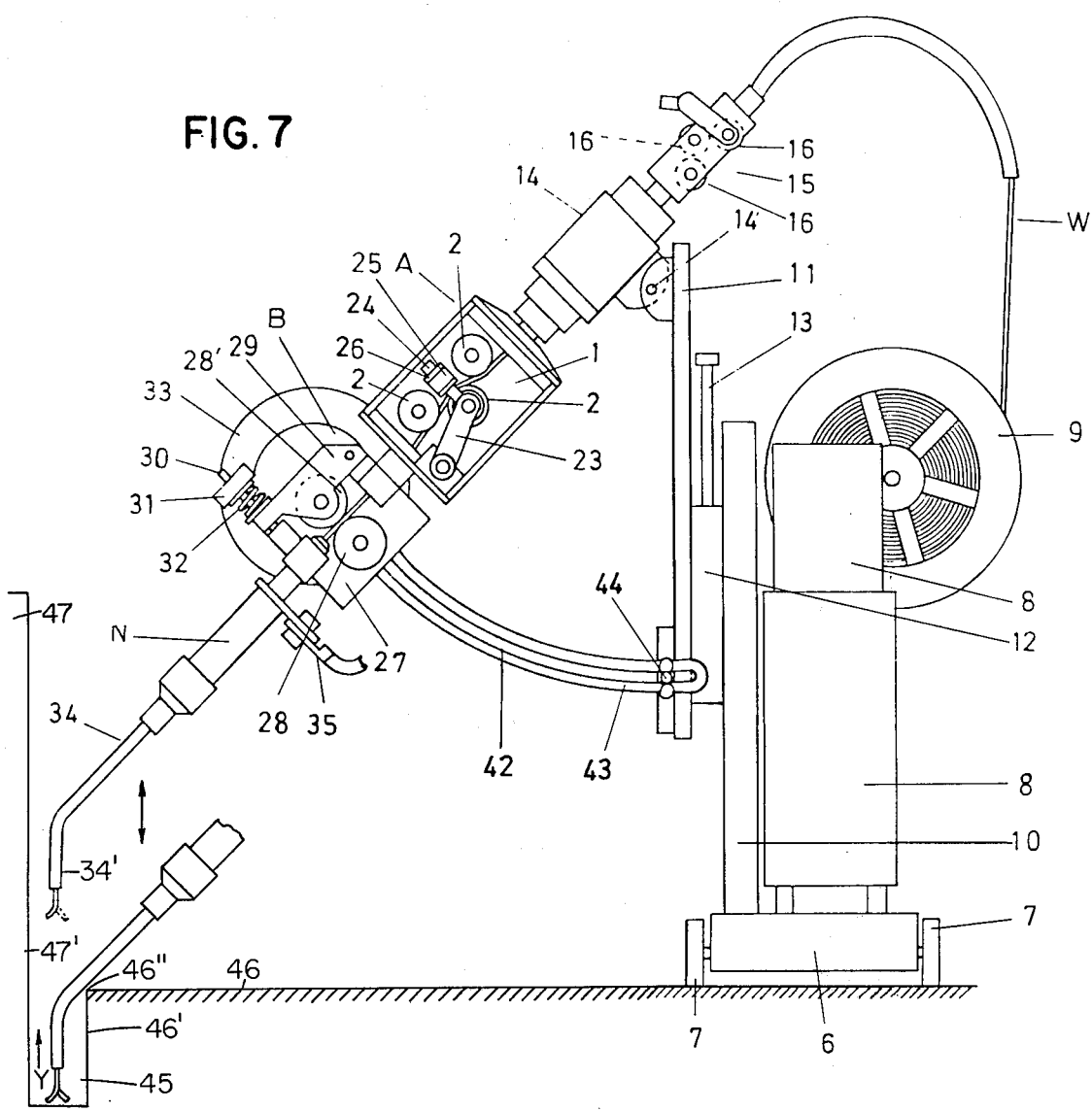

ARC WELDING METHOD AND ARC WELDING APPARATUS

BACKGROUND OF THE INVENTION

The present invention relates to an arc welding method and apparatus which cause the end of the welding wire to be delivered rotatively in a definite period, and weave it from the delivery hole of the welding nozzle without causing the welding nozzle to be displaced, moved or rotated necessarily in perpendicular direction with respect to that of the welding line in butt welding of thick board.

DESCRIPTION OF THE PRIOR ART

The conventional weaving method in which, the welding wire is shaken in a perpendicular direction with respect to that of the welding line, places molten metal widely on the welded part in butt welding of thick board as is illustrated in FIG. 1. FIG. 1 (a) shows a case in which the welding nozzle N does not move in a perpendicular direction with respect to that of the welding line, but the arc is made rotate by the magnetic force of the coil C which is provided at the end of the nozzle N. FIG. 1 (b) shows another case in which the nozzle N is moved left and right in a perpendicular direction with respect to that of the welding line. FIG. 1 (c) shows the other case in which the nozzle N is shaken left and right with the supporting point S as its center.

In addition, symbol W indicates the welding wire, R indicates the sending roller of the wire W, and M indicates the driving motor of the sending roller R.

In narrow gap welding, it is quite difficult to have nozzle N moved or shaken as in FIG. 1 (b) or 1 (c) because the scope of the movement of the nozzle is restricted in the welding of an "I" type groove, for example, in the case where the diameter of the end of the nozzle is at least longer than 6 mm compared to the groove of 12 mm. And there is also a danger that defective welding may arise because of the arc between the nozzle and welded material.

Furthermore, it is impossible to provide a coil C as shown in FIG. 1 (a) in the case of narrow welding groove.

SUMMARY OF THE INVENTION

It is an object of the present invention to provide an arc welding method and apparatus which causes the end of the welding wire to be rotated in a definite period and thereby weave it without causing the welding nozzle to be displaced or shaken as is customarily necessary in butt welding of thick board.

Another object of this invention is to provide a welding method and apparatus which are applicable to butt welding and narrow groove welding, for example, the welding of a box girder provided with gusset plates.

Other objects and further scope of applicability of the present invention will become apparent from the detailed description given hereinafter; it whould be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 7 shows a top view of another example of the present invention.

DETAILED DESCRIPTION OF PREFERRED EMBODIMENTS

Figure 1:
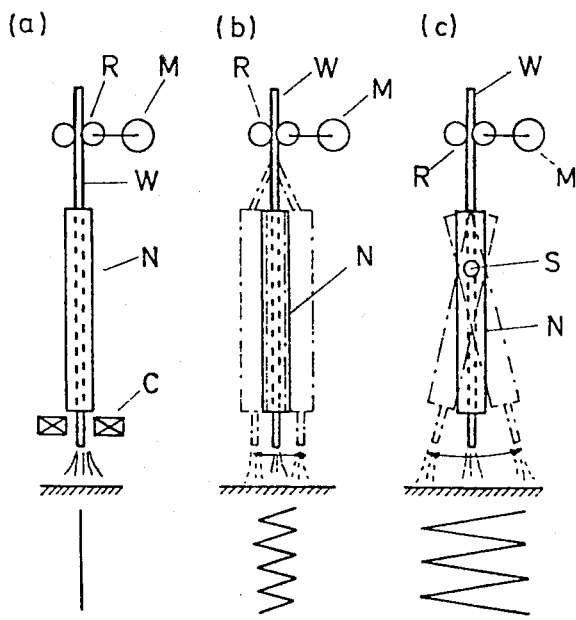
FIG. 1 (a), (b), (c) are those for explanation of conventional weaving welding methods.

At first, the principle of this invention is described hereinafter with reference to FIG. 2.

The welding wire W which comes from a wire reel and passes through a wire reformation apparatus is introduced to welding nozzle N through curvature giving apparatus A, in which several rollers 2 are arranged in a zigzag line and rotatably on a base 1. Plastic deformation of definite curvature is given to the wire W itself by passing of the wire W through the rollers 2. Furthermore, the whole of the curvature giving apparatus A is able to rotated with a constant period by motor 3, and continuous deformation of definite curvature over the range of 360°, that is, a spiral deformation is able to be given to the wire.

Accordingly, the wire W is introduced to the nozzle N by the wire sending apparatus B provided with rollers 5 which are driven by the motor 4, and the wire W exiting from the nozzle N transforms spirally according the plastic deformation of the definite curvature given by the curvature giving apparatus A by the plasticity of the wire W itself. And, the end of the wire W displaces while rotating from the end of the nozzle N, and the arc generated from the end of the wire W becomes a spiral arc which has the same curvature as that of the wire W. The orbit D of the arc is shown in FIG. 2.

Furthermore, as the diameter of the wire W is, for example, 1.2 mm or 1.6 mm, the wire W is able to rotate freely in a narrow groove.

Accordingly, utilizing this invention, it is possible to weave the welding arc and make the arc soak into the welded material without moving or shaking the nozzle N by giving a spiral deformation to the wire W transforming according the wire W to the spiral deformation after passing through the welding nozzle, and causing the end of the wire W to be displaced rotatively from the end of the nozzle N. Moreover, it is possible to prevent an occurrence of the arc between the nozzle N and the welded material by providing insulation around the nozzle N, because the nozzle N is not moved or shaken.

Figure 2:
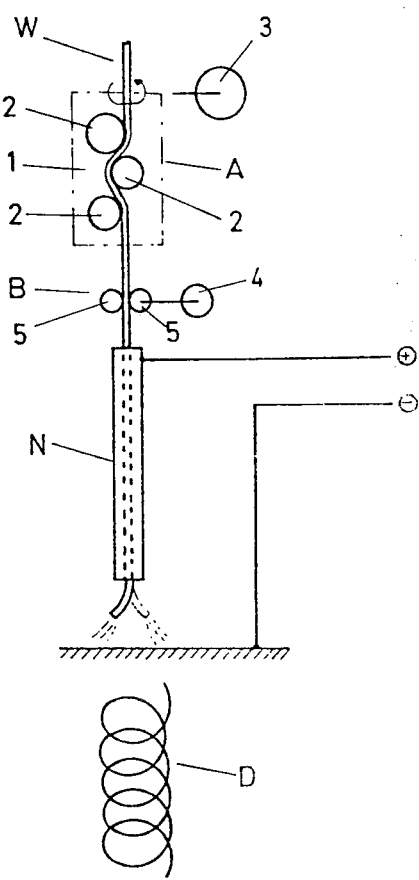
FIG. 2 is that for explanation of the principle of the present invention.

Besides, it is possible to get a welded part of good quality metallurgically speaking because a kind of movement is given to molten metal, and the exhaust of harmful gas from the molten metal is promoted when the arc is rotated as shown by the symbol D in FIG. 2.

It is possible, furthermore, not only to move the nozzle N in the direction of the welding line without moving it in a perpendicular direction with respect to the former, but also to move the nozzle N left and right as shown in FIG. 1 (b) or to shake the nozzle N as shown in FIG. 1 (c) together with the foregoing operation.

Figure 3:
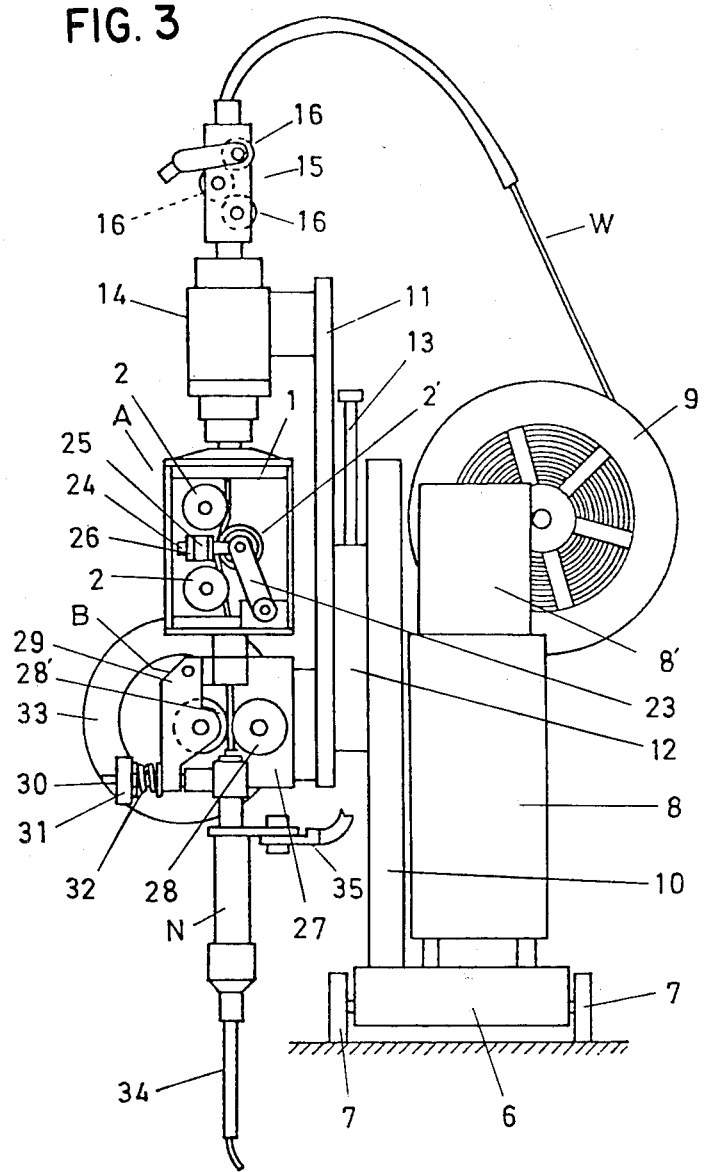
FIG. 3 shows a front view of one example of the present invention.
Figure 4:
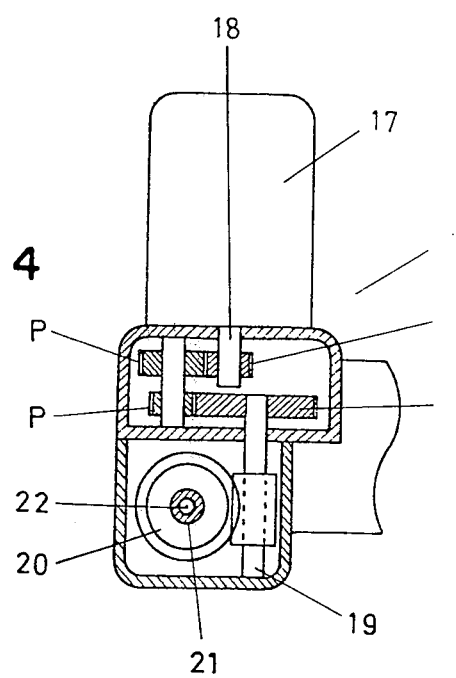
FIG. 4 shows a cross-sectional view of the driving apparatus of the example.

In next place, this invention is described in detail hereinafter with reference to FIG. 3 and 4 which illustrate a concrete example of this invention.

In the Figures, numeral 6 indicates a stand car which runs parallel with the welding groove, 7 indicates wheels of the stand car 6, 8, 8′ indicate operational boards being built up on the stand car 6 and provided with operational buttons, regulators, and meters. Numeral 9 indicates a wire reel supported by the stand car 6, 10 indicates a base board planted on the stand car 6, 11 indicates a movable board which is set so as to be movable upwards and downwards and parallel with the base board 10, 12 indicates a up-down apparatus to accomplish motion in a vertical direction which is set up between the base board 10 and the movable board 11, and the up-down apparatus 12 can cause the movable board 11 to be fixed at a position of definite height by rotatory tightening of operational bar 13.

Numeral 14 indicates a driving apparatus which is supported on the movable board 11 and rotates the curvature giving apparatus A. Numeral 15 indicates a wire reformation apparatus which is set up on the driving apparatus 14 and is provided with several rollers 16 which reform the winding curvature of the wire W from the wire reel 9.

The construction of the driving apparatus 14 is described as follows referring to FIG. 4.

The rotation of driving axle 18 of the motor 17 is transmitted to warm axle 19 decelerated by gears P. Worm gear 20 gears with the worm axle 19 and the axle 21 of the worm gear 20, that is, the axle of the curvature giving apparatus A rotates the curvature giving apparatus A. And, the wire W from the wire reformation apparatus 15 is inserted into the central hole 22 provided through the axle 21 of the worm gear 20, and is introduced to the curvature giving apparatus A.

In the curvature giving apparatus A, as described above, two static rollers 2, 2 are mounted rotatably on the base 1, and other movable roller 2′ is set up between the both rollers 2, 2. This movable roller 2′ is mounted rotatably on a supporting bar 23 pivoted by the base 1, and the position of the movable roller 2′ is regulated by the regulation bar 24 pivoted by the end of the supporting bar 23. In detail, the regulation bar 24 is inserted into static piece 25 mounted on the base 1, and the position of the movable roller 2′ to the static rollers 2, 2 is regulated by nut 26.

The wire W introduced to the curvature giving apparatus A passes through between the upper static roller 2 and the movable roller 2′ and between the movable roller 2′ and the lower static roller 2, and a plastic deformation of definite curvature is given to the wire W. For example, it was possible to get a good result of weaving welding by sending the wire W 10 m in a minute by rotating 150 rotations in a minute in the case of welding of narrow groove of 12 mm.

The wire sending apparatus B is supported at the lower part of the movable board 11.

Numeral 27 indicates the base of the wire sending apparatus B, 28 indicates a driving roller fixed to the base 27, 28′ indicates a passive roller confronting the driving roller 28 supported by a supporting piece 29 pivoted by the base 27, 30 indicates a regulating bar mounted on a base 27, 31 indicates a knob by which the supporting piece 29 is pushed through a spring 32, and the position of the passive roller 28′ is regulated by the knob 31, and pressure which is forced to the wire W between both rollers 28, 28′ is regulated. Besides, numeral 33 indicates a driving motor which drives driving roller 28 provided with decelerating mechanism.

Furthermore, the welding nozzle N is fixed to the lower part of the wire sending apparatus B, an extension 34 is provided at the lower part of the nozzle N, and the wire W from the wire sending apparatus B is delivered through the introduction hole of the nozzle N and comes out from the hole in the extension 34. Numeral 35 indicates a terminal of the power supply connected to the upper part of the nozzle N.

By the construction described above, the wire W from the wire reel 9 passes through the driving apparatus 14 after being reformed by the wire reforming apparatus 15, and is given a plastic deformation of definite curvature in a constant period by the curvature giving apparatus A which is rotated by the driving apparatus 14. It is sent to the nozzle N in a definite speed by the wire sending apparatus B and the wire W exiting from the nozzle N transforms according to the given plastic deformation. The end of the wire W exits spirally from the end of the nozzle N, and weaving welding takes place in this way.

Besides, it is possible to use this method to rotate the curvature giving apparatus A together with moving or shaking the nozzle N a perpendicular direction with respect to that of the welding line as described above.

Accordingly, it is possible to effect butt welding of an "I" type narrow groove by utilizing this invention in the case of butt welding of thick boards of 100 or 200 mm where the butt welding of "H" or "X" type groove has taken place conventionally. It is possible to decrease the quantity of the welded metal and also to decrease the time required for the welding and, furthermore, it is possible to raise up the efficiency of the working by utilizing this invention.

In the next place, another example of this invention is described as the following.

At first, the problem of conventional butt welding is described.

Figure 5:
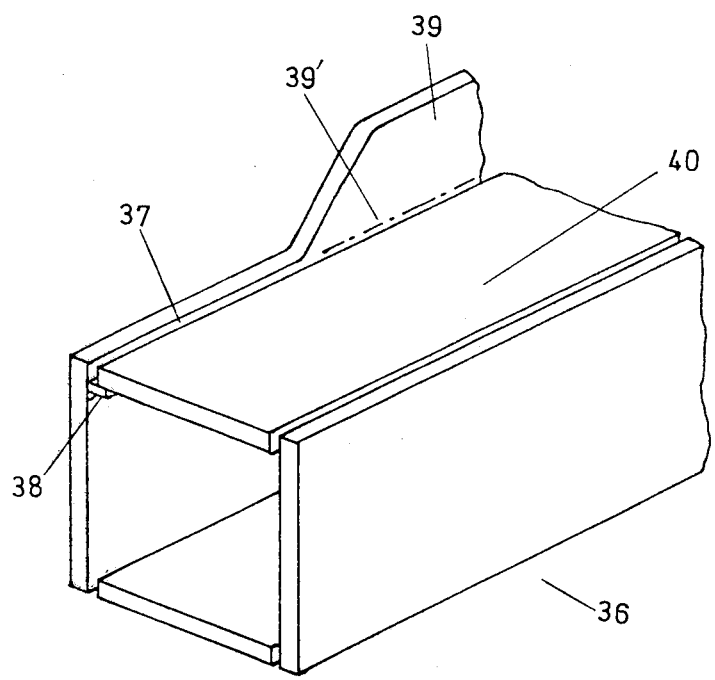
FIG. 5 shows a perspective view of one part of the box girder to which the present invention is applied.
Figure 6:
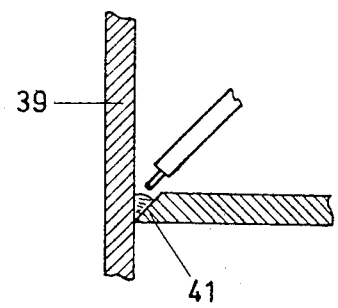
FIG. 6 shows a cross-sectional view of one part of FIG. 5.

Conventionally, in the box girder shown in FIG. 5, it is possible to place the welding at the groove indicated by numeral 37 by attaching a metal board 38 temporarily, but it is impossible to dispose the welding nozzle so that it is positioned vertically at the welding part indicated by numeral 39′ of the gusset plate 39. So, metal inert gas welding and weaving welding are used together by making a "V" type groove as shown in FIG. 6. But this method is uneconomical, however, because a large quantity of wire is required when the thickness of the upper plate 40 of the box girder is large, and the narrow groove welding is more advantageous than that, especially when the thickness is larger than 25 mm.

In this place, another example of this invention which provides a narrow groove welding method and apparatus appropriate to butt welding is described hereinafter with reference to FIG. 7.

This apparatus shown in FIG. 7 differs from that shown in FIG. 3 in the following manner. That is, the driving apparatus 14 which rotates the curvature giving apparatus A is supported rotatably by the supporting axle 14' on the upper part of the movable board 11. In the wire sending apparatus B, a guide bar 43 which has a guide hole 42 of circular arc type with the supporting axle 14' as its center is fixed to the side of the apparatus B, and the driving apparatus 14, the curvature giving apparatus A, and the wire sending apparatus B are supported in any direction, for example, at 45 degrees direction from the horizontal by a butterfly nut 44 at the lower part of the movable board 11. A holding apparatus H which holds said curvature giving apparatus and others is thus constructed by said supporting axis 14', said guide bar 43, and said nut 44.

The end of the extension 34 at the lower part of the nozzle N is curved, the hole of the extension 34 is provided parallel with the direction Y of the depth of the groove.

The direction Y of the depth of the groove 45 corresponds to a direction parallel with the side walls 46', 47' of the plates 46, 47 which constructs said groove 45 between them and perpendicular with the edge 46" of the plate 46'.

In the case where it is difficult to arrange the welding nozzle N in the direction Y of the depth of the groove 45 because of the arrangement of the plates 46, 47, the welding nozzle N should be arranged oblique with the direction Y by the holding apparatus H and the end 34' of the extension 34 should be arranged parallel with the direction Y.

Here, the extension is properly exchanged according to the angle in which the welding nozzle N is arranged so that the end 34' of the extension 34 should be arranged parallel with the direction Y.

Arranging the welding nozzle N and the extension 34 described above, it is possible to effect arc welding by running the carriage 6 along the groove 45, the end of the welding wire W to which a spiral deformation is given rotation coming out from the hole of the end 34' of the extension 34.

Accordingly, it is possible to effect the narrow groove welding even in the case when it is difficult to place the welding nozzle parallel with the direction Y of the depth of the narrow groove, like the butt welding for the gusset plate of the box girder. And it is very economical because the quantity of the wire consumed is small, and the apparatus is also simple compared to the conventional metal inert gas welding in the case when the thickness of the welded plate is large.

In next place, the other example of this invention is described as the following.

Conventionally, in the automatic metal inert gas welding of aluminium or aluminium alloy, there is a defect in that it is impossible to get a good result of welding metallurgically because blowholes are unable to be removed from the surface of the welded metal.

So, it is thought to apply this invention to the conventional automatic metal inert gas welding of aluminium or aluminium alloy.

That is, the end of the wire is delivered spirally in a definite period from the delivery hole of the welding nozzle, and the arc spot is moved along the welding line with its rotative movement. The welded part which should have already been solidified will be melted again, and the nucleus of the blowholes will be floated up and discharged perfectly from the metal by disturbing the molten metal.

Besides, this invention is applicable to groove welding of every type like "I," "V," and "X." It is also possible to utilize this invention in any welding on downward, upward, vertical, and horizontal welding lines. Furthermore, it is possible to mount only a single layer on the welding portion without using the conventional several layers mounting.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What we claim is:

1. An electric arc welding method, in which molten metal is deposited along a welding line, comprising the steps of:
   (a) feeding a welding wire, which has been arranged in a substantially straight line, into a plastic deforming zone which is continuously rotated through a range of 360°;
   (b) causing said wire supplied to said zone to be first plastically deformed from its substantially straight line shape, and then plastically reformed back into said substantially straight line shape, whereby the welding wire supplied to said zone is simultaneously spirally deformed and reformed and also subjected to a unidirectional continuous rotary circular motion through a 360° range;
   (c) feeding the welding wire after it leaves the plastic deforming zone to an elongated nonconsumable welding nozzle positioned at the welding line;
   (d) causing the welding wire to leave the tip of the welding nozzle so that it is at an angle with respect to the central axis of said nozzle and also is rotating through a range of 360°;
   (e) simultaneously causing the welding nozzle to move from one end of the welding line to the other end thereof, whereby the path traversed by the bent and rotating end of the welding wire as it leaves the welding nozzle along the welding line is that of a helix wholly contained in a single plane thus achievng full agitation of the weld metal by periodic remelting a portion of the welding line to produce a dense weld.

2. The method as recited in claim 1, in which the welding wire is plastically deformed from its straight line shape and then plastically reformed back into said straight line shape by passing it through a set of three rollers, of which two rollers have their centers on a line, and the third roller, disposed therebetween, has its center offset from said line.

3. The method as recited in claim 1, in which the welding line traversed by the welding nozzle is horizontally disposed.

4. The method as recited in claim 1, in which the welding line comprises a narrow gap between two workpieces which are to be welded together.

5. The method as recited in claim 1, in which the welding line comprises the junction of two workpieces which are to be butt welded.

* * * * *